March 26, 1946.  J. KLINGE  2,397,148
CONNECTING LINK FOR CHAINS
Filed Jan. 13, 1944

INVENTOR.
JOHN KLINGE
BY
ATTORNEY

Patented Mar. 26, 1946

2,397,148

UNITED STATES PATENT OFFICE 2,397,148

CONNECTING LINK FOR CHAINS

John Klinge, Dubuque, Iowa

Application January 13, 1944, Serial No. 518,095

1 Claim. (Cl. 59—87)

This invention relates to link chains, having special reference to a link which may be substituted for a defective link, at any point within the length of a link chain.

An object of the present invention is to provide a link composed of two equal half portions, each having a double ended loop, connected by bars, both of which contains apertures receptive of the links of a chain, when brought into registration, and when the loops are stressed prevent passage therethrough.

A further feature is the provision of a band, slidable on the opposite bars, of such dimensions as to retain the halves of the link in juxtaposition at all times, and means to limit the movement of the loops to such distance as to fully open the apertures in the opposite bar.

Another purpose is to produce an effective device for connecting link chains easily and quickly, entirely without recourse to extraneous appliances or tools of any kind.

These objects are accomplished by the novel construction, combination and arrangement of few and simple parts, hereinafter described and illustrated in the accompanying drawing, constituting a pictorial part of this disclosure, and in which.

Figure 1:
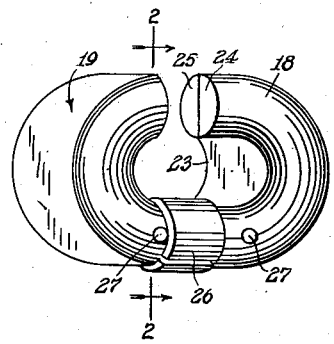
Figure 1 is a perspective view of an embodiment of the device shown in open position.
Figure 2:
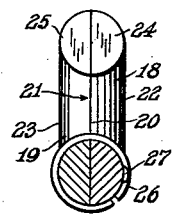
Figure 2 is a transverse sectional view taken on line 2—2 of Figure 1.
Figure 3:
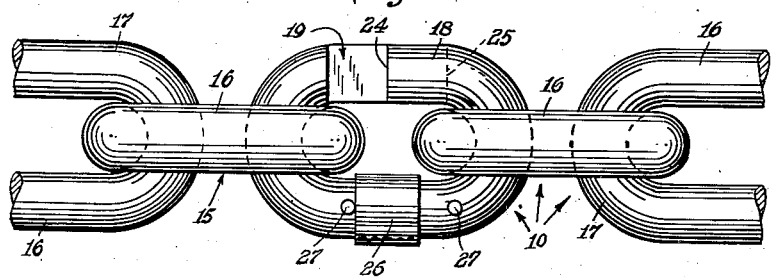
Figure 3 is a side elevational view of a series of ordinary chain links engaged at their adjacent ends by a link made in accordance with the invention.
Figure 4:
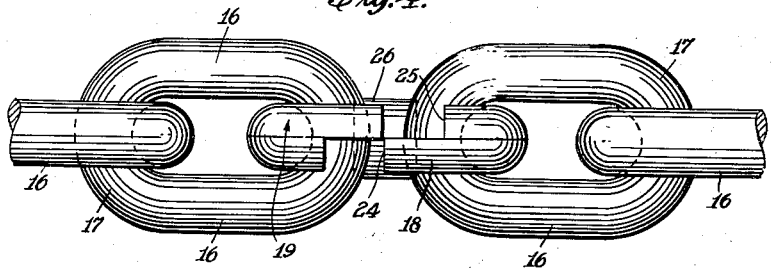
Figure 4 is a plan view of the same.

Referring in detail to the drawing, the numeral 10 designates in general the links of a common chain, each presenting parallel bar-like elements 16, spaced apart a distance somewhat in excess of the diameter of the material used and united at their ends by curved loops 17, formed by forging, welding or like means.

Obviously, the failure of any one link by excessive wear, faulty material, uncommon stress, etc. renders the chain unusable until repairs have been made, hence the utility of a link that can be instantly substituted for one that is defective.

The present invention is composed of a link having two identical half portions 18—19, each having straight flat sides 20—21 and convex outer surfaces 22—23, conforming closely to the shape and dimensions of the chain links to be engaged.

Each half link, in one side only of one of its bar members, has a transverse cut 24—25 offset one from the other, forming spaces between their ends of sufficient length to admit the end links of the chain to be connected.

Thereafter the half links are shifted lengthwise, closing the gap and retaining the links securely.

In order to retain the half links in proper relative position, a split slidable band 26 is mounted on the pair of bar elements on the side opposite the gap, and, in order to retain the band at a point substantially opposite the gap, lugs 27 are formed on the bar, limiting its movement. The split band 26 allows a slight separation of the two half-links to permit of free sliding of the half-links on each other, and the lugs 27 limit the relative movement of the split band on the half-links so that the ends of the band will not be forced against the concave corners of the U-shaped ends of the half-links, and be expanded excessively, with the result of causing excessive looseness between the half links, so that they would accidentally shift from the proper positions and open up, when the chain was in slack.

What is claimed as new and sought to secure by Letters Patent, is:

A connecting link for chains, consisting of two companion half links forming when placed side-by-side a single chain link, each half link having a flat side face and having two parallel side bars and one of said side bars having a link receiving opening extending wholly across said side bar, the half-links being constructed so that the link-receiving opening of one half-link will be normally out of registration with the link-receiving opening of the other half link, the links being shiftable on each other so that both of said openings are closed at the same time, one of the half links having stop lugs on one side thereof arranged in spaced relation to each other, and a split band enclosing the non-split side bars of the half links and arranged between the stop lugs the width of the split band being less than the space between the lugs.

JOHN KLINGE.